No. 665,113. Patented Jan. 1, 1901.
A. KITSON.
INCANDESCENT LAMP.
(Application filed Mar. 19, 1900.)
(No Model.)
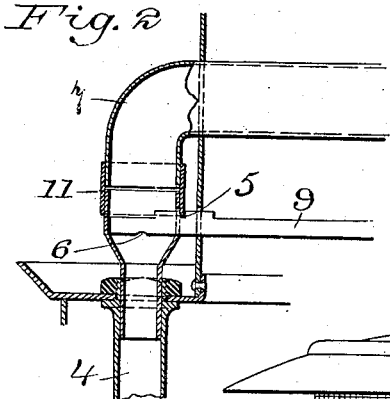
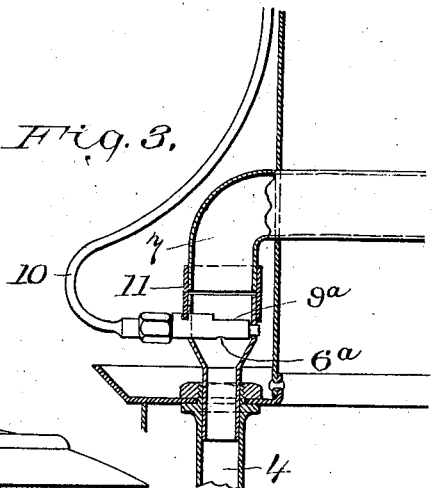
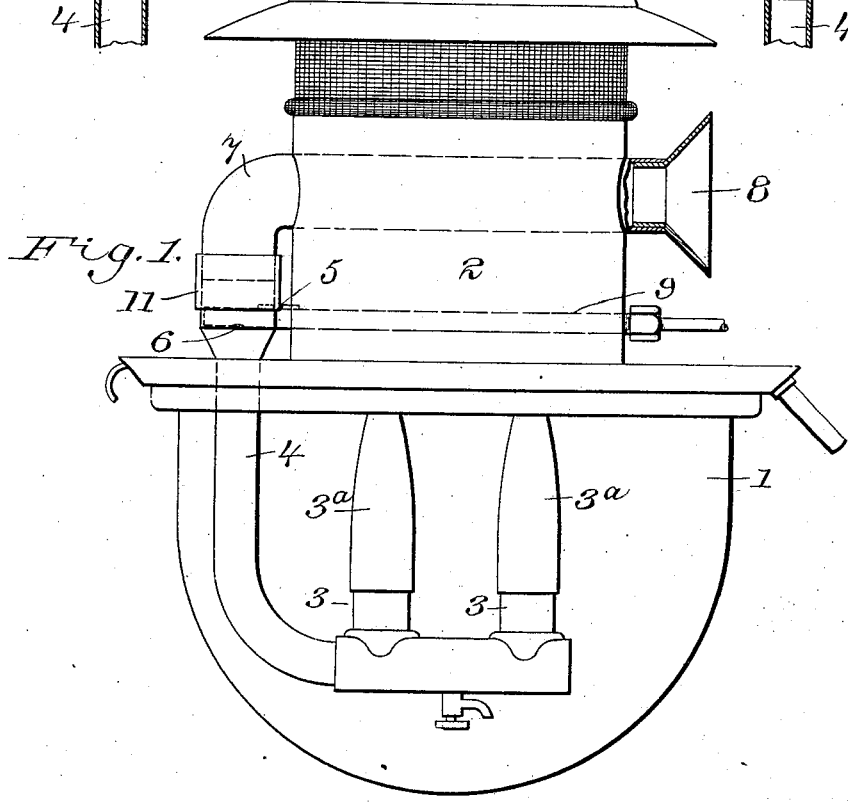
WITNESSES:
INVENTOR
Arthur Kitson
BY
ATTORNEY

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

INCANDESCENT LAMP.

SPECIFICATION forming part of Letters Patent No. 665,113, dated January 1, 1901.

Application filed March 19, 1900. Serial No. 9,134. (No model.)

*To all whom it may concern:*

Be it known that I, ARTHUR KITSON, a subject of the Queen of Great Britain, and a resident of Philadelphia, (Germantown,) county of Philadelphia, State of Pennsylvania, have invented certain new and useful Improvements in Incandescent Lamps, of which the following is a specification.

My invention relates in general to lamps burning a combustible mixture of gases or vaporized fuel and air under one or more incandescent mantles; and more specifically it consists of an improved form of lamp of such character designed to burn kerosene, natural gas, or some other form of fuel-gas devoid of enriching or illuminating materials.

To this end my invention comprises a convenient arrangement for preheating the air to be mixed with the fuel by means of the heat given off by the lamp itself; and the invention finds its simplest embodiment in an extension for the mixing-tube used in the standard form of oil-burning lamp of this character, said extension passing through the chimney of the lamp, so that the air passing through it is subjected to the heat of the burners of the lamp and so delivered to the mixing-tube proper in a heated condition.

The preferred form of apparatus embodying my invention is illustrated in the accompanying sheet of drawings, in which—

Figure 1 is a side elevation and partial section of a lamp with my invention applied thereto. Fig. 2 is a detail in section showing the mixing-tube and its extension, together with the fuel-supply tube. Fig. 3 is a similar view of a modification.

Throughout the drawings like reference-figures indicate like parts.

The lamp shown in Fig. 1 has a hemispherical glass globe 1, a chimney 2 above the same, and one or more burners 3 3, provided with incandescent mantles 3ª below said chimney. These burners are mounted on a mixing-tube 4, through which the combustible mixture of air and fuel is delivered to the burner or burners. The fuel-supply is through the tube 9, which in the oil-burning lamp is a vaporizing-tube extending across the chimney above the burners and incandescent mantles and having its discharge-opening 6 for the jet of vapor over the open end of the mixing-tube 4. The extension 7 for said mixing-tube is preferably made separate from the mixing-tube, and it extends through and across the chimney 2, above the tube 9, having a removable flared mouthpiece 8.

Any convenient means of connecting the mixing-tube with its extension may be employed; but I preferably use the coupling-ring 11, which surrounds the abutting ends of the tube and its extension and forms a muff-coupling for the two. Preferably this coupling-ring rests upon the fuel-supply tube 9, and the latter may have a notch 5 formed on its upper side into which the ring may drop, as shown in the drawings.

In the modification shown in Fig. 3 a special arrangement for fuel-gas or producer-gas is shown. The fuel-tube 9ª is made shorter and does not extend across the lamp-chimney. The flexible tube 10, being connected to the outer end of the fuel-tube 9ª, delivers the gas under pressure, so that it is discharged into the mixing-tube in a jet through the opening 6ª in the same manner as the jet of vapor is delivered in the oil-burning lamp.

The mode of operating my invention is of course evident from the foregoing description. The jet of gas or vapor delivered through the discharge-opening 6 or 6ª passes down the mixing-tube 4, drawing in with it the necessary amount of air to produce a combustible mixture. The air being drawn in through the extension 7 of the mixing-tube, which extends across the chimney 2, becomes highly heated. In taking the lamp apart the coupling-ring 11 is lifted until it clears the upper end of the mixing-tube 4, and then the extension 7 may be swung around and by removing the flaring mouthpiece 8 the extension can be withdrawn from the lamp-chimney. The fuel-supply tube 9 or 9ª can also be withdrawn from the mixing-tube for cleaning or replacement after the coupling-ring 11 has been lifted clear of the notch 5. When the parts are reassembled, the coupling-ring 9 drops down into the notch 5 and all the parts are securely locked together.

The advantages of my invention consist in the higher candle-power produced by the fact that the heated air adds to the heat given off by the burners and also in the fact, where oil is used, that the preheating of the air prevents any condensation of the oil in the mixing-tube. This is of considerable importance where low-grade oils are being used, which are liable to deposit tar and similar impurities. The construction shown is also extremely convenient in that it can be applied to many thousand standard lamps already manufactured by simply cutting the holes in the chimney for the extension 7, removing the muffler, which usually is placed over the mouthpiece of the mixing-tube, and assembling the parts as shown in Fig. 1.

It is evident, of course, that various changes could be made in the details of construction illustrated without departing from the spirit and scope of my invention, so long as the relative arrangement of parts or principle of operation disclosed is preserved. Other forms of extension-tube might be substituted and other arrangements for coupling and locking the parts together might be employed. The form of fuel-supply tube and discharge-opening therein might be modified and other variations in form made and still leave the resulting construction within the limits of my invention.

Having therefore described my invention, what I claim as new, and desire to protect by Letters Patent, is—

1. The combination of the lamp-casing and chimney above said casing, a burner located in the casing under the chimney, an incandescent mantle for said burner, a mixing-tube for supplying a combustible mixture of air and fuel to the burner, and an air-supply tube connected as an extension of said mixing-tube and extending across the lamp-chimney together with detachable connecting means between said mixing-tube and the extension thereof.

2. The combination of the lamp-casing and chimney above said casing, a burner located in the casing under the chimney, an incandescent mantle for said burner, a mixing-tube for supplying a combustible mixture of air and fuel to the burner, and an extension of said mixing-tube which extends across the lamp-chimney, together with the vaporizing-tube extending across the chimney and discharging into the upper end of the mixing-tube, and a coupling-ring resting on said vaporizing-tube and surrounding the abutting ends of the mixing-tube and of its extension.

3. The combination of the lamp-casing and chimney above said casing, a burner located in the casing under the chimney, an incandescent mantle for said burner, a mixing-tube for supplying a combustible mixture of air and fuel to the burner, and an extension of said mixing-tube which extends across the lamp-chimney, together with the vaporizing-tube extending across the chimney and discharging into the upper end of the mixing-tube, and a coupling-ring resting on said vaporizing-tube and surrounding the abutting ends of the vaporizing-tube and of its extension, said vaporizing-tube having a notch formed on its upper surface into which the coupling-ring fits, whereby the parts are all locked together.

4. The combination of the lamp-casing and chimney above said casing, a burner located in the casing under the chimney, an incandescent mantle for said burner, a mixing-tube for supplying a combustible mixture of air and fuel to the burner, and an extension of said mixing-tube which extends across the lamp-chimney, together with a fuel-supply tube which discharges into the mouth of the mixing-tube proper and a coupling-ring which rests on the fuel-supply tube and surrounds the abutting ends of the mixing-tube proper, and of its extension.

5. The combination of the lamp-casing and chimney above said casing, a burner located in the casing under the chimney, an incandescent mantle for said burner, a mixing-tube for supplying a combustible mixture of air and fuel to the burner, and an extension of said mixing-tube which extends across the lamp-chimney, together with a fuel-supply tube which discharges into the mouth of the mixing-tube proper and a coupling-ring which rests on the fuel-supply tube and surrounds the abutting ends of the mixing-tube proper, and of its extension, said fuel-supply tube having a notch in its upper surface into which the coupling-ring fits, whereby the parts are all locked together.

Signed at New York, N. Y., this 27th day of February, 1900.

ARTHUR KITSON.

Witnesses:
W. H. PUMPHREY,
A. PARKER-SMITH.